(12) United States Patent
Jones et al.

(10) Patent No.: US 7,124,784 B2
(45) Date of Patent: Oct. 24, 2006

(54) EJECTOR DRIVE HUB APPARATUS AND METHOD

(75) Inventors: Samuel E. Jones, Carthage, MO (US); Craig V. Millett, Granby, MO (US); R. Calvin Tatum, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 11/027,866

(22) Filed: Dec. 30, 2004

(65) Prior Publication Data

US 2006/0144462 A1  Jul. 6, 2006

(51) Int. Cl.
*B21F 15/04* (2006.01)

(52) U.S. Cl. ......................................... 140/93.6; 100/31

(58) Field of Classification Search ............... 140/93.6, 140/101; 100/31; 289/2; 72/452.6; 74/567; 56/451, 452

See application file for complete search history.

(56) References Cited

U.S. PATENT DOCUMENTS 4,577,554 A * 3/1986 Brouse ........................ 100/26
5,558,507 A * 9/1996 Magnus ....................... 417/474
6,698,177 B1 * 3/2004 Akehi et al. .................. 56/236

* cited by examiner

Primary Examiner—Lowell A. Larson
(74) Attorney, Agent, or Firm—Husch & Eppenberger LLC; Grant D. Kang

(57) ABSTRACT

The present invention is an ejector drive hub. The ejector drive hub comprises an axial through hole in a cylinder with a slot in the circumferential side wall of the cylinder. The slot truncates less than 180° of the cylinder. The ejector drive hub has an engagement face for a cam or pawl to drive it rotationally. A radial through hole in the slot forms a communicating opening between the slot and the axial through hole. The ejector drive hub further comprises a mount adapted to maintain a drive pawl in operative position relative to the radial through hole. The ejector drive hub further has at least one notch for engagement of a latch to maintain the ejector drive hub in a stationary position during knotting. The ejector drive hub has a boss to actuate an ejector. The boss and the disc portion of the ejector drive hub are integrally fabricated from a single piece of material as by machining.

19 Claims, 9 Drawing Sheets

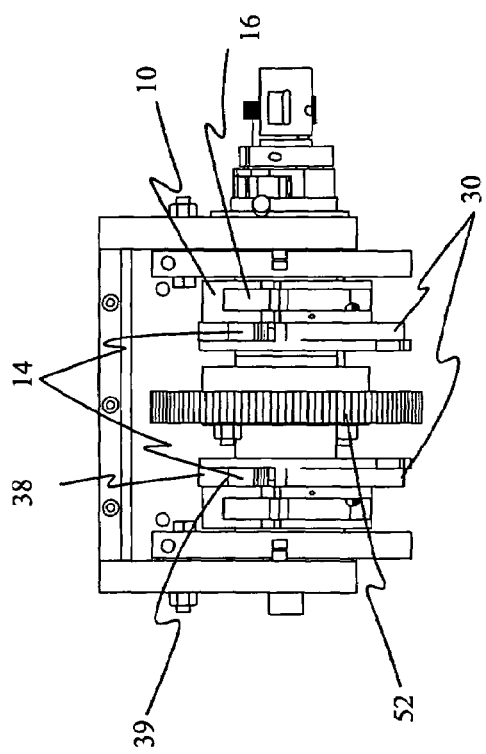
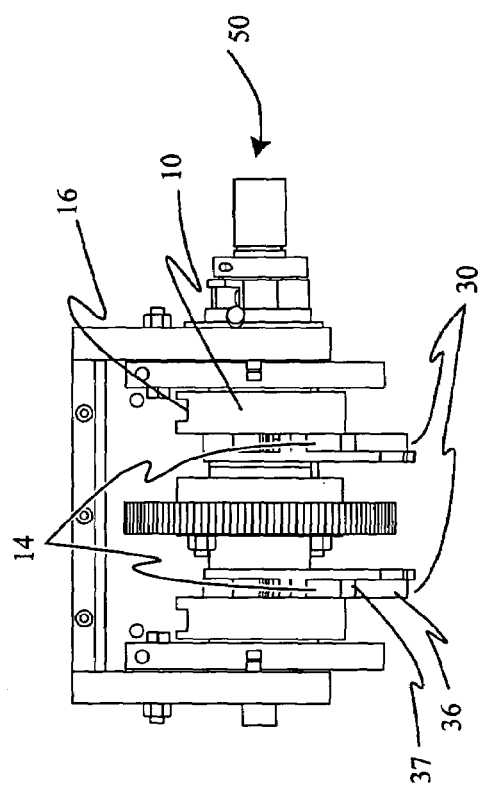

EJECTOR DRIVE HUB APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention is in the field of binding and baling operations, more particularly in the field of wire knotting.

2. Related Art

In the field of binding and baling bulk material items such as cotton with wire, a variety of mechanical wire knotters are known in the art. These knotters work in conjunction with a baling equipment bed through a variety of techniques wraps a length of wire around a volume of bulk material to be baled and delivers a leading end of each individual wire proximate to a trailing end, the same wire, which has been cut by the baling machine. These wire ends are then acted upon by wire knotters to secure them so that they will retain the bulk material bale in a compressed volume after the baling machine releases the bale.

Knotting is typically achieved by twisting the two wire ends around one another. To do so, the wire ends are captured together in a slot or groove and then a gear wheel pinion or the like rotates in order to twist them together. After the twisting operation is complete, the separate mechanical component pushes the knotted wires out of the groove because the overall knotting apparatus is generally configured around a rotating drive shaft which delivers a rotational energy through a series of gears to the actual knotting linkage, it is advantageous for the ejector mechanism to also be actuated by a rotational device.

Hence in the prior art, ejector drive hubs were designed. These hubs had capacity to be driven by the overall drive shaft, typically by a boss detent. They also had a capacity to be held stationary while the drive shaft and other machinery rotated during knotting, typically by a latch and notch arrangement. Finally, the ejector drive had an extension boss or the like mentioned in position to engage corresponding boss or extension on an ejector in order to first drive it for ejection of the wire and secondly return the ejector to its rest position.

Baling is often of bulk materials comprised of agricultural products and is hence a seasonal activity. Accordingly, speed is of the essence in order to process large volumes of bulk material in a short amount of time. Therefore the balers and knotters are designed to work very quickly have a high throughput and perform a large number of cycles in succession. Additionally, bales are typically bound under tons of pressure and the wires to be knotted are required to meet standards wiring the knots to remain bound under thousands of pounds of tension. These high tensions can put extra strain on knotter parts.

Prior art ejector drive hubs, the actual drive boss designed to engage the ejector to actuate it was a separate piece to be attached to the rotating disc portion of the ejector drive hub. Attachment can be by a variety of methods, such as threading the boss and screwing it into a corresponding hole and the disc, bolting or otherwise. However, due to the high stress, high turnover and rapid cycle time necessary for mechanical knotter operations, such two-part construction of ejector drive hubs lead to frequent breakage due to wear of the fixation between the boss and disc. Finally, a cam is required to operate prior art ejector drive hubs.

There is a need in the art for greater durability of ejector drive hubs for wire knotters. Moreover, there remains a continuing need for ease of manufacture of ejector drive hubs, reduction of extraneous parts and economy. Durability of the properly positioned boss relative to the disc portion of the ejector drive hub is related to the continuing need for a maintenance precise positioning of the boss over many cycles in order that its engagement with the other moving parts of the knotter made efficient.

Finally, through many cycles of use, wear deforms or erodes inter-operative faces on the ejector and ejector drive hub, causing parts to vary from designed tolerances. There is a need for a boss design or shape that continues to operate well during and after wear of the parts.

SUMMARY OF THE INVENTION

It is in view of the above problems that the present invention was developed. The present invention is an ejector drive hub. The ejector drive hub comprises an axial through hole in a cylinder with a slot in the circumferential side wall of the cylinder. The slot truncates less than 180° of the cylinder. The ejector drive hub has an engagement face for a cam or pawl to drive it rotationally. A radial through hole in the slot forms a communicating opening between the slot and the axial through hole. The ejector drive hub further comprises a mount adapted to maintain a drive pawl in operative position relative to the radial through hole. The ejector drive hub further has at least one notch for engagement of a latch to maintain the ejector drive hub in a stationary position during knotting. The ejector drive hub has a boss to actuate an ejector. The boss and the disc portion of the ejector drive hub are integrally fabricated from a single piece of material as by machining.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 7 depicts the ejector drive hub and ejector in a neutral or rest position;

FIG. 8 depicts the ejector and ejector drive hub in eject position; and

BRIEF DESCRIPTION OF THE PREFERRED EMBODIMENTS

Referring to FIGS. 1, 2, 3 and 4, wherein like reference numbers indicate like elements, ejector drive hub 10 is comprised of a disc portion 12 and a boss 14. The boss 14 and disc portion 12 are integrally fabricated from a single piece of material. In the depicted embodiment, the entire ejector drive hub is machined from a single piece of steel. In the depicted embodiment, 4130 steel is used.

Figure 1:
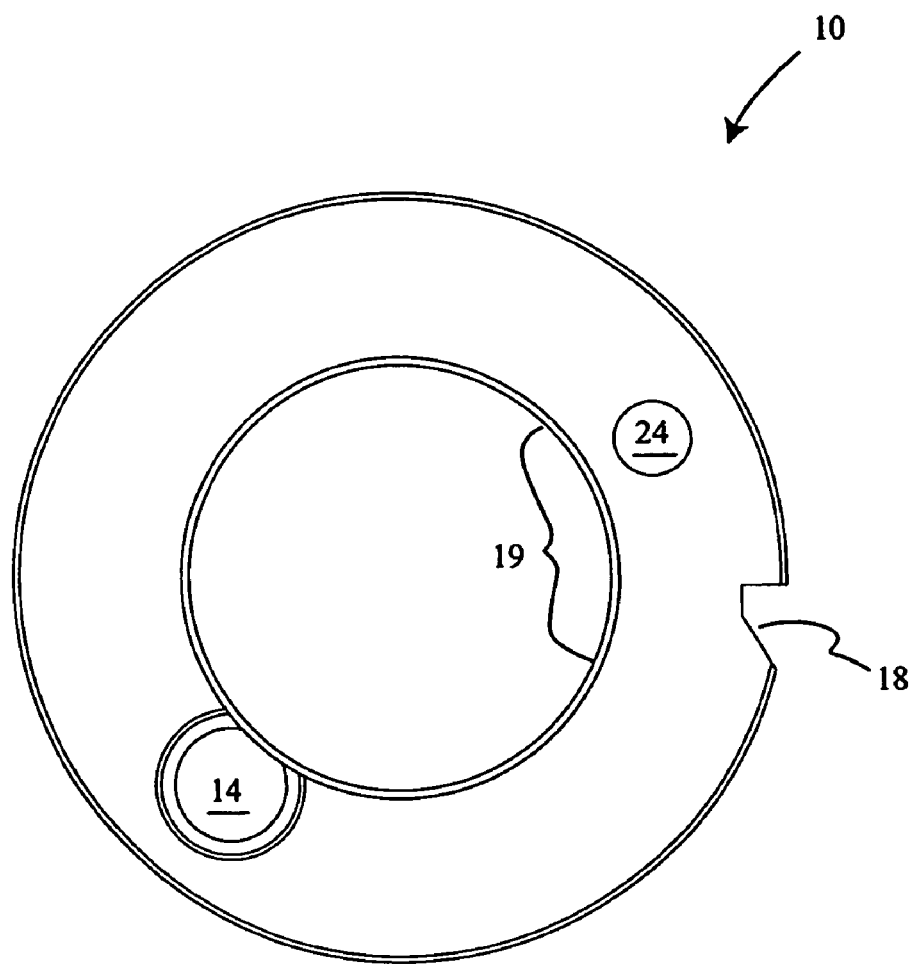
FIG. 1 is a top view of the ejector drive hub.
Figure 2:
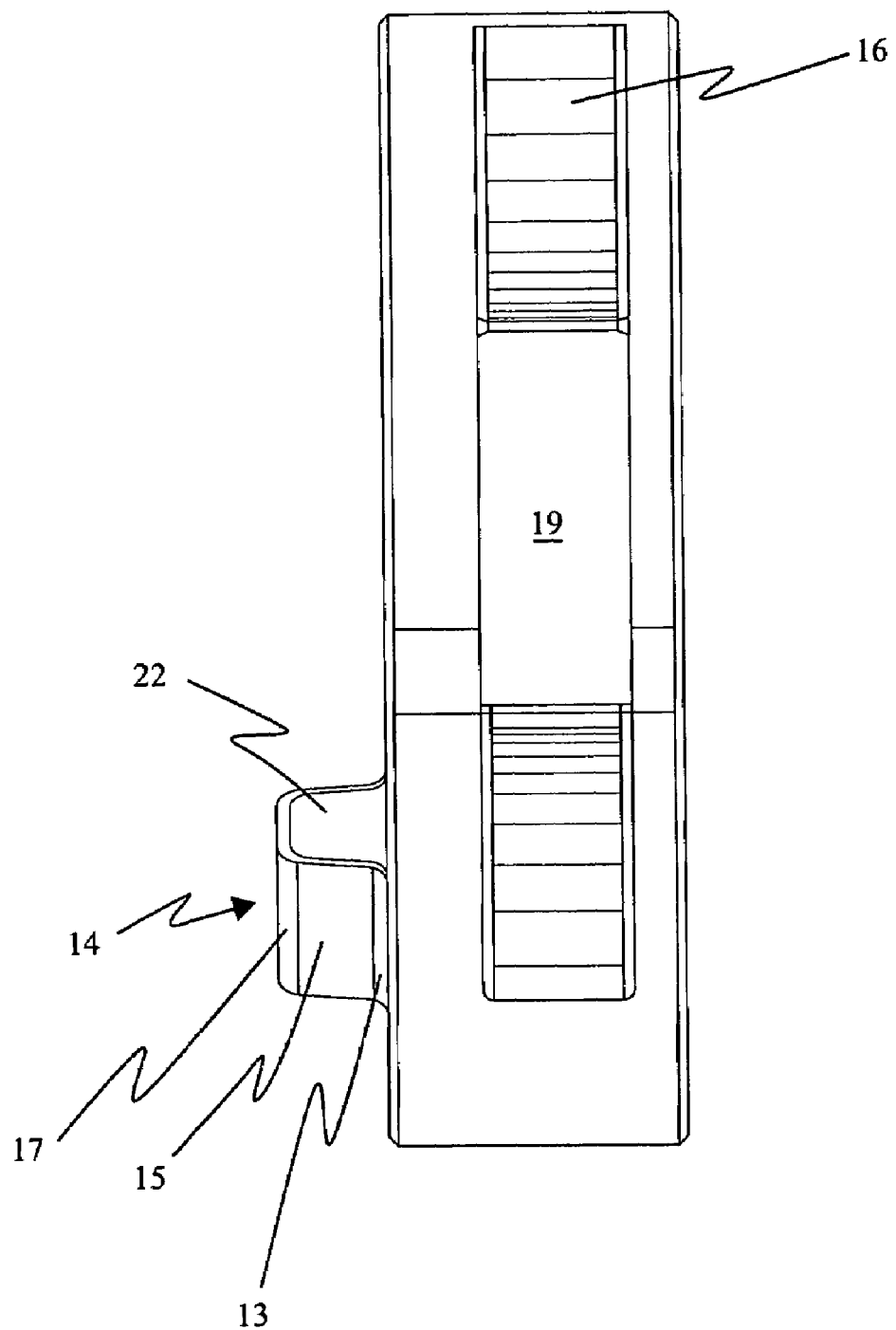
FIG. 2 is a side view of the ejector drive hub.
Figure 3:
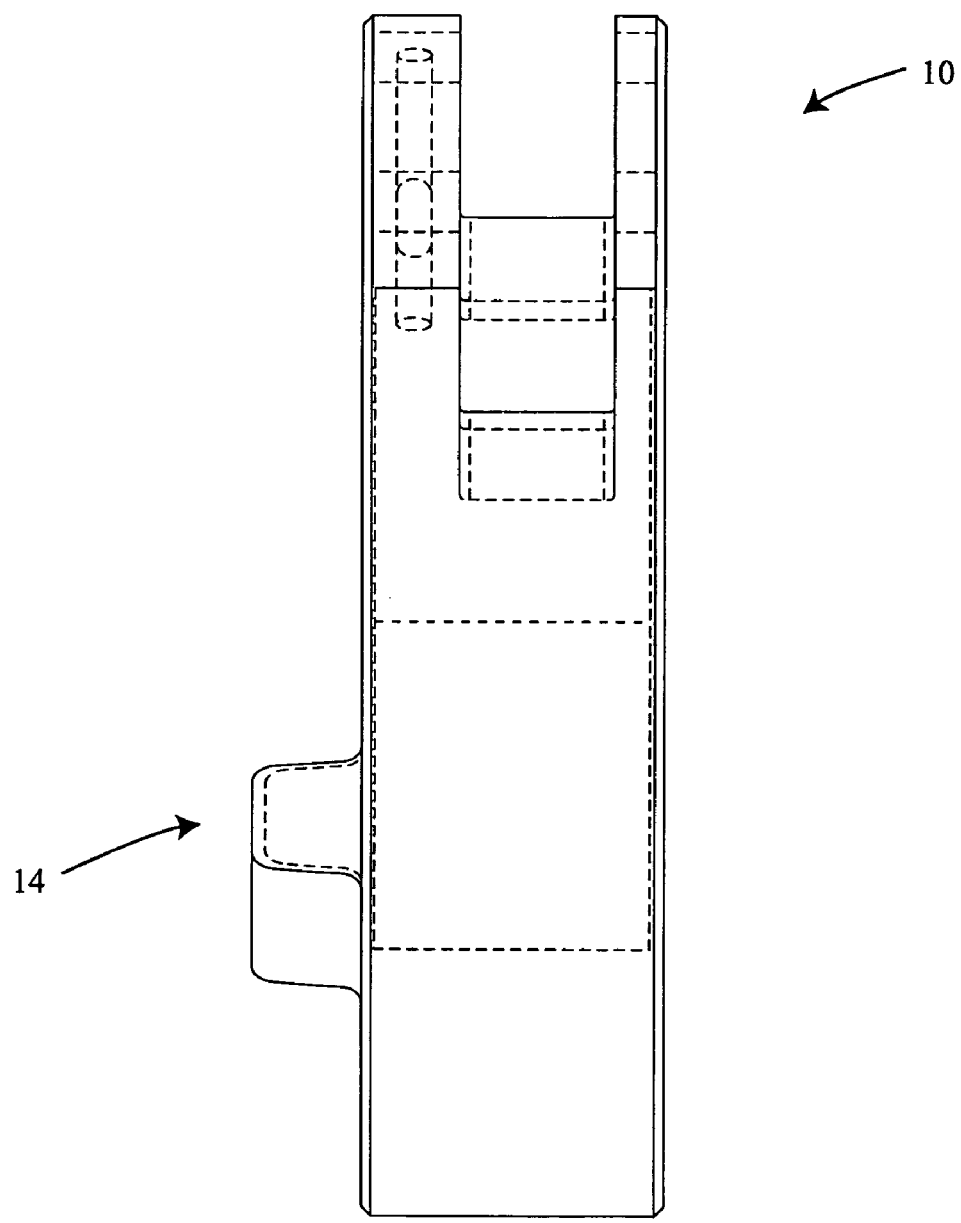
FIG. 3 is a second side view of the ejector drive hub.
Figure 4:
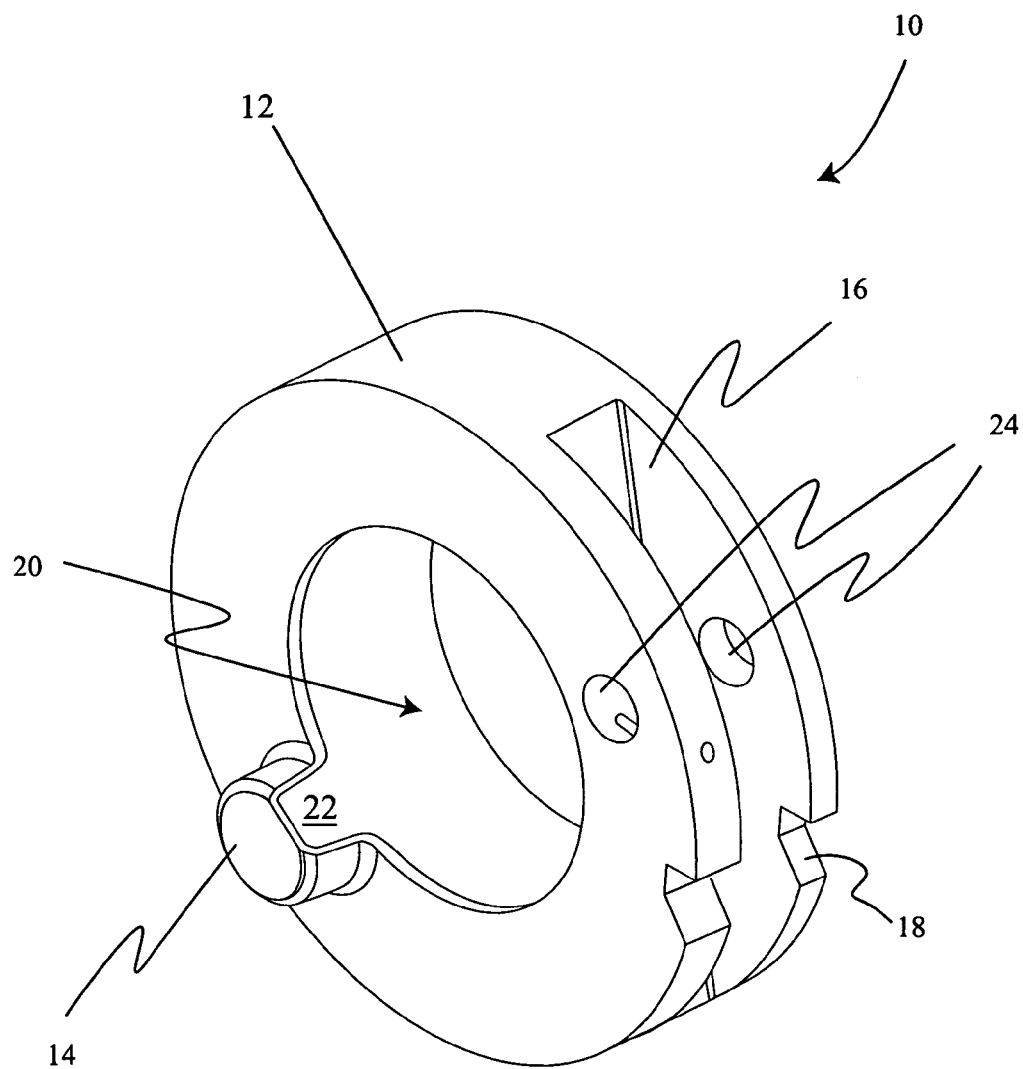
FIG. 4 is a perspective view of the ejector drive hub.

The ejector drive hub disc portion includes a detent 16 for receiving a cam or pawl to drive the ejector drive hub rotationally. The ejector drive hub disc portion 12 further has at least one notch 18 for receiving a latch to maintain the ejector drive hub in a stationary position during knotting. The ejector drive hub further has an axial throughhole 20 dimensioned such that the ejector drive hub can be mounted upon and closely cooperate with an internal drive hub which is in turn fixedly mounted on a driveshaft. Visible only in side view FIG. 2 is a radial throughhole 19 through which a pawl may engage with the internal drive hub for driving the ejector drive hub 10, as described below.

In the depicted embodiment, the relative stability and durability of the boss 14 is further enhanced by it being partially cutaway at area 22 such that the boss may also closely cooperate with the driveshaft and receive support from it, at least during some angles of its actuation of the ejector, as described below.

Figure 5:
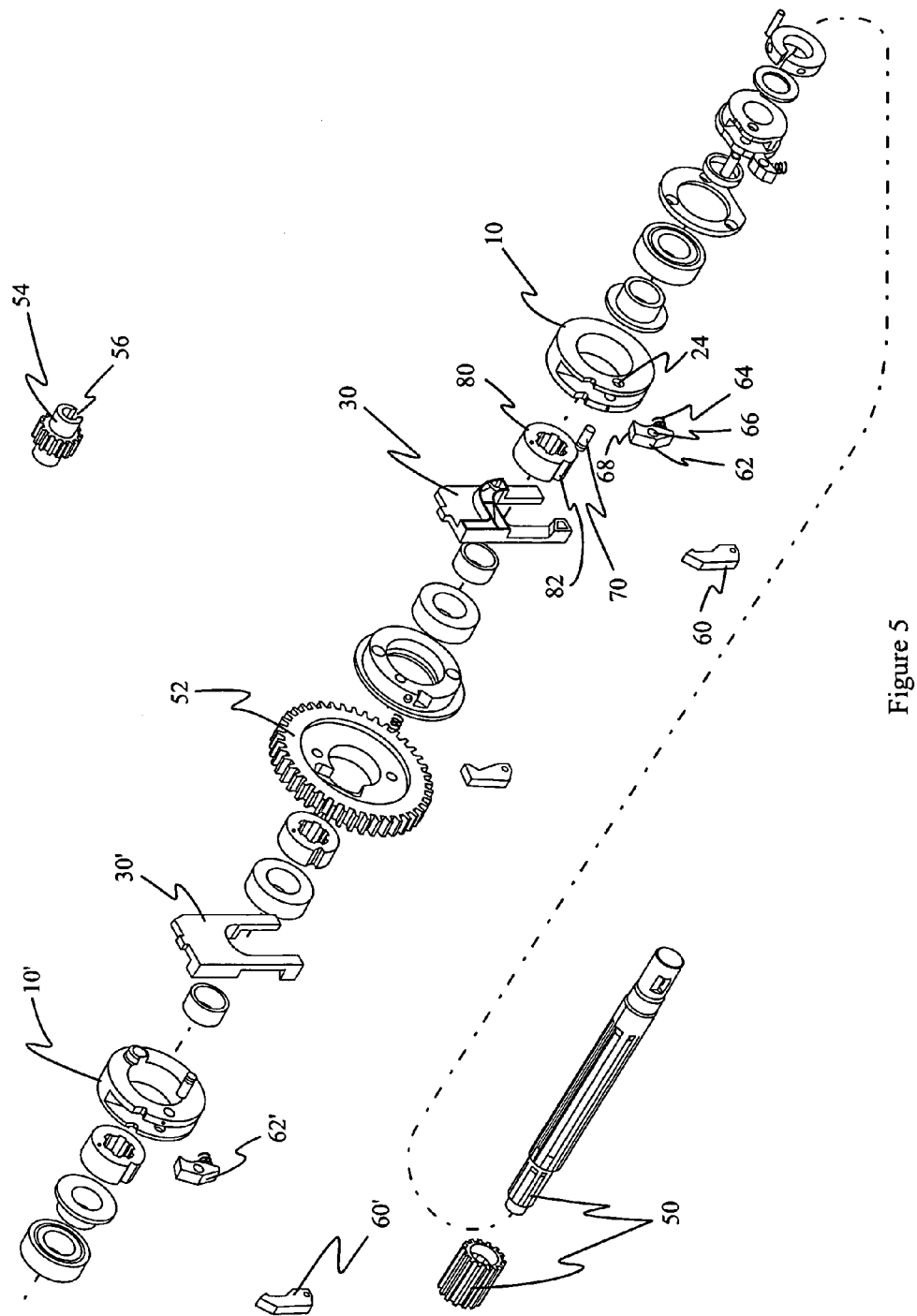
FIG. 5 is an exploded view showing the wire knotter.
Figure 6:
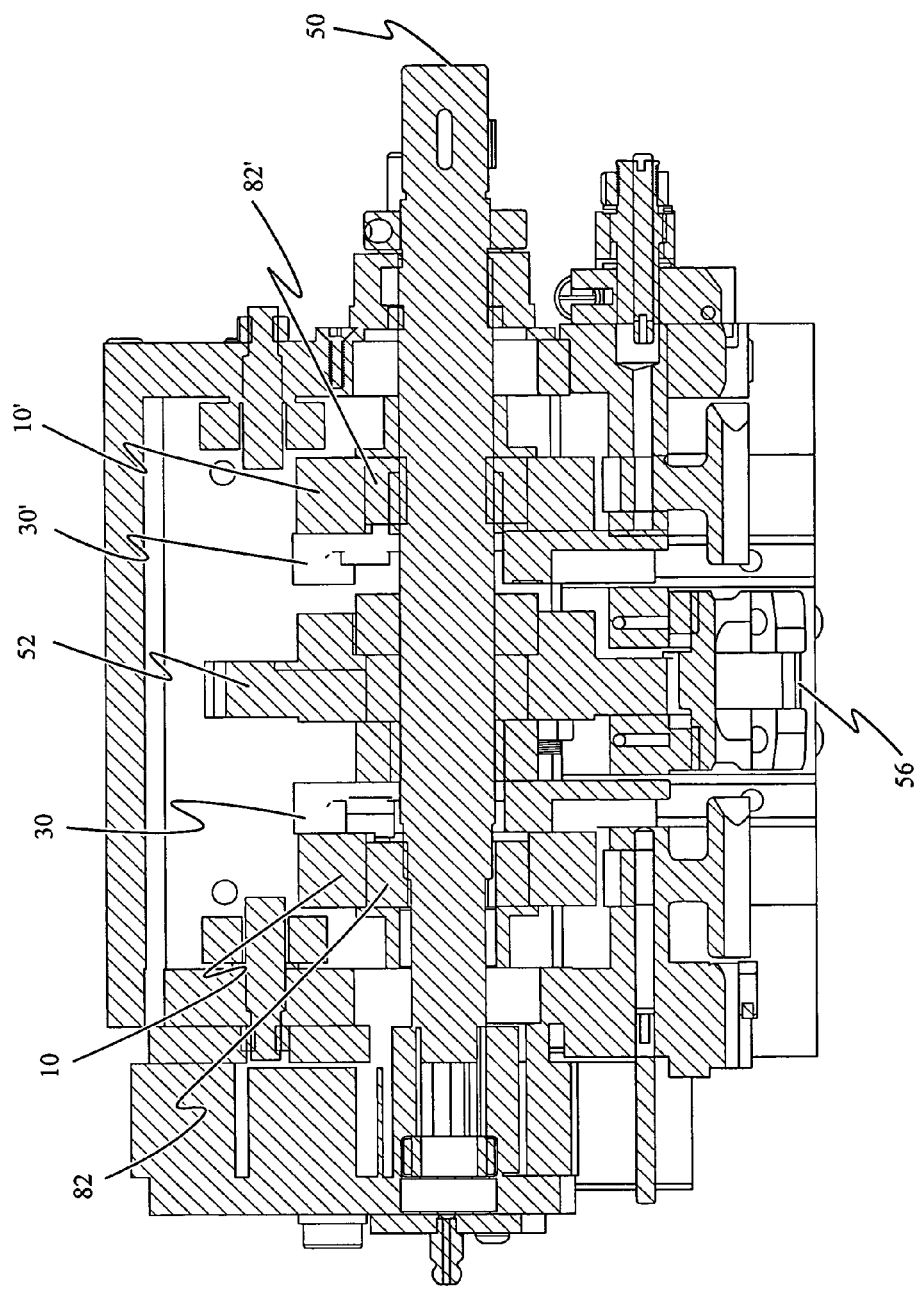
FIG. 6 is a sectional view of the wire knotter.

Referring now to FIGS. 5 and 6, the wire knotter is further comprised of a drive shaft 50 that has mounted upon it components including the pinion drive gear 52, two ejector drive hubs 10 and 10', two ejectors 30 and 30' and a variety of other components known in prior art knotters. The twister pinion 54 engages the pinion drive gear 52 and is driven by it. The twister pinion also has a slot 56 to which one of the two wire ends is inserted.

Thereafter, when driven by the pinion drive gear, the pinion rotates four times and twists the wire ends together in a knot.

Also visible on the exploded drawing of FIG. 5 are latches 60 and 60' and drive pawls 62 and 62'. Each drive pawl is further comprised of a biasing spring 64, a through hole 66 and a drive engagement extension 68. Pin 70 is assembled with through hole 24 in ejector drive hub 10 along with through hole 66 and ejector drive pawl 62 so that the ejector drive pawl 62 may rotate around pin 70. Drive hub 80 is inserted entirely within this axial throughhole 20 of ejector drive hub 10. The outer diameter of the drive hub 80 is dimensioned to closely cooperate with the inside diameter of axial throughhole 20 of the ejector drive hub 10, allowing the drive hub 80 to rotate within axial throughhole 20 of ejector drive hub 10. Accordingly, while the wire is being knotted, the drive hub 80 rotates around four times inside the stationary ejector drive hub 10. The drive hub 80 also has a notch 82. This notch is designed to engage and drive the drive extension 68 of drive pawl 62. Spring 64 biases drive extension 68 towards a drive hub 80, and, notch 82 when notch 82 rotates into position. The ejector drive hub 10 includes a slot 16. The slot 16, as can be seen on FIGS. 1–4, includes a through hole 19, between axial throughhole 20 of the ejector drive hub 10 and the slot 16. Through this through hole 19, the drive extension 68 or drive pawl 62 extends so that it may contact the outer diameter of drive hub 80 and, when the timing is correct, be engaged and driven by drive hub notch 82. When the timing is correct, this assembly will drive ejector drive hub 10 simultaneously with drive hub 80. Accordingly, drive hub 80 turns four times within the ejector drive hub 10 while the wire is being knotted, and then rotates the drive hub 80 a fifth time, with the drive pawl 62 engaging the ejector drive hub 10 so that it too rotates. On the fifth rotation, the ejector drive hub 10 will operate the ejector to eject the knotted wire in the manner described below.

On the first four rotations of the knotter, that is during knotting of the wires, the ejector drive hub 10 must remain stationary. This is achieved by latch 60 holding the ejector drive hub stationary by engaging notch or notches 18. Latches 60 and 60' are released by rotation of the latching end of the latch around its pivot end by a cam which is engaged by known timing linkages on the ejector rotation of the knotter, which in the depicted embodiment is a fifth rotation.

In FIG. 5 and FIG. 6, the twister pinion is assembled and located towards the bottom of the drawing. Both FIGS. 5 and 6, in operation, the knotted wire would be ejected downwards or towards the bottom of FIGS. 5 and 6. Accordingly, the movement of the ejectors 30 is up and down in FIGS. 5 and 6. The downwards motion is the ejection movement. An upwards motion is a return to a rest position.

Figure 9A:
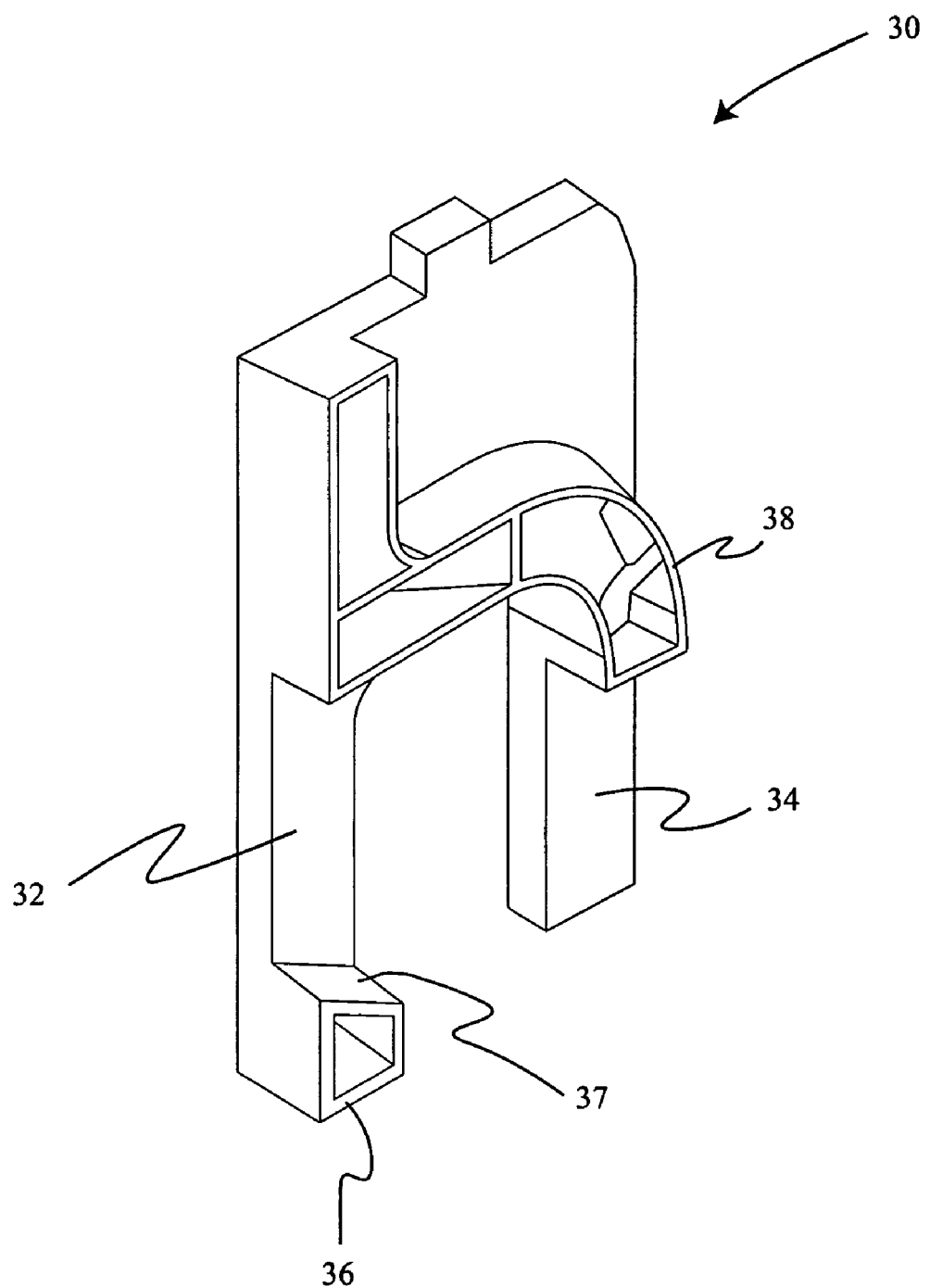
FIGS. 9A and 9B are opposite side perspective views of the ejector shown in isolation.
Figure 9B:
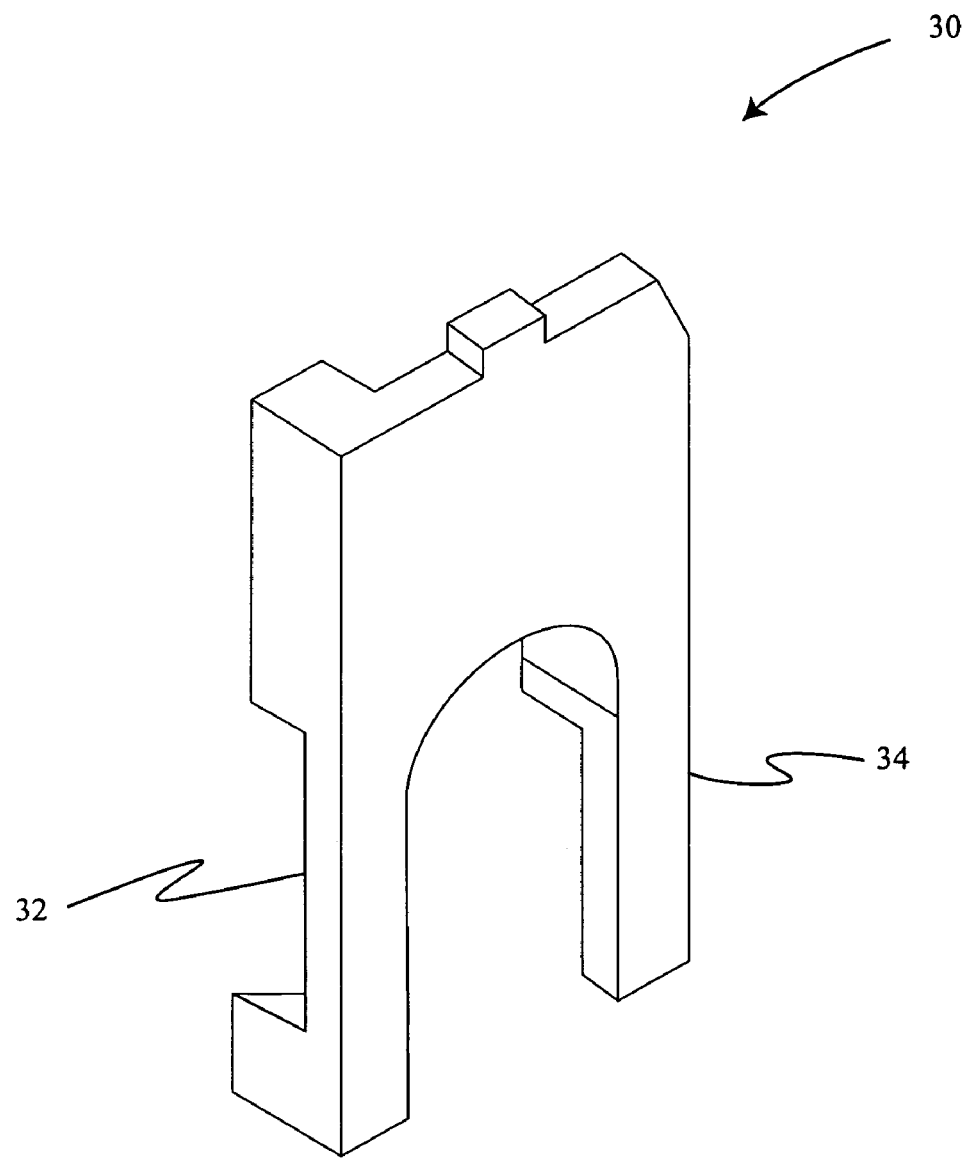

Referring now to FIGS. 9A and 9B, ejector 30 is comprised of two forks 32 and 34. Fork 32 includes an extension 36 at its lowermost end. Fork 34 includes an extension 38 towards its uppermost end. Extension 36 includes an upwards facing surface 37. Extension 38 includes a downwards facing surface (39, see FIG. 7) which is obscured in these drawings. The boss 14 of the ejector drive hub will engage these surfaces to move the ejector up and down. The top surface 37 of extension 36 is engaged by the boss 14 for ejection. As the ejector drive hub rotates counterclockwise in FIG. 5, it will contact surface 37 and cause the ejector 30 to slide downwards in the knotter. A bottom surface extension 36 will contact the knotted wire and push it out of the slot 56 in the twister pinion 54. Thereafter, the baled bulk material will be removed from the overall baling apparatus. In the meantime, the ejector drive hub will continue its rotation bringing boss 14 around, across the open space of the downwards facing U-shape of ejector 30. The boss 14 will continue rotating upwards and thereupon engage the bottom surface of extension 38. As the ejector drive hub 10 finishes the fifth or ejector rotation of the cycle, by applying pressure to extension 38, it will push the ejector 30 back upwards into its rest position.

FIGS. 7 and 8 show selective elements of the ejector drive hub, ejector and wire knotter assembly, with other elements omitted for clarity. Drive shaft 50 and pinion drive gear 52 are included. FIG. 7 depicts the ejectors in their retracted or neutral position. FIG. 8 depicts the ejectors in their extended, ejecting position. The omission of parts such as the drive palls and latches allow FIGS. 7 and 8 to show the engagement of the ejector drive hub boss 14 with the extensions 36 and 38 of the ejectors and the boss engagement surfaces 37 and 39.

In FIG. 7, the bosses 14 are shown maintaining the ejectors 30 in their neutral or rest position. In the depicted embodiment, the side surface of the bosses 14 are in contact with surface 39, which is the downwards facing surface of top extension 38 of ejectors. In FIG. 8, the bosses 14 are shown engaged with lower extensions 36 at surface 37 of those extensions. This engagement is caused by the operational rotation of the ejector drive hub 10. This rotation forces the boss downward and into driving contact with surface 37 of extension 36. As can be seen by observing the position of the slot or detent 16, in FIG. 7 compared with FIG. 8, the ejector drive hub has rotated the boss 14 into its proper functional positions.

After extending the ejectors 30 as depicted in FIG. 8, ejector drive hub 10 will continue rotating in order to bring the bosses 14 back to the neutral or rest position. In so doing, the bosses 14 shall again contact surface 39 of extension 38 of ejectors 30, and raise or retract the ejectors 30 back to their neutral position.

As will be apparent to those of skill in the art, boss 14 is subject to resisting force on the ejection stroke. Through many cycles, a bolt or other non-integral fixation of boss 14 to the ejector drive hub cylinder 12 will wear and eventually breakdown. The integral fabrication of the boss 14 with the ejector drive hub improves durability and obviates repair.

Boss 14 is further designed to improve smooth operation and durability. The side faces 15 of boss 14 are tapered to converge towards the top of boss 14. The angle in the depicted embodiment is 4°, from the center axis of boss 14. Boss 14 also has a chamfer 17 at its top (which includes face 22) and a spread or widening taper 13 at its base. The tapered sidewall 15 accommodates variability, wider tolerances and wear in the interoperation of the boss 14 with ejector surfaces. The wide base 13 and chamfer 17 avoid, chips, burrs, and other accelerated wear patterns experienced with un-chamfered prior art bosses.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An ejector drive hub comprising:
a cylinder;
an axial through hole in said cylinder;
a slot in a circumferential side wall of said cylinder, said slot truncating less than about 180° of said cylinder;
a radial through hole in said slot forming an opening communicating between said slot and said axial through hole;
a notch in said side wall of said cylinder;
a mount adapted to maintain a drive pawl in operative position relative to said radial through hole;
a boss, said boss being on one side of said cylinder; and said boss being integrally formed with said cylinder.

2. The ejector drive hub of claim 1 wherein said cylinder and boss are 4130 steel.

3. The ejector drive hub of claim 1 wherein said boss is chamfered at its top.

4. An ejector drive hub comprising:
a cylinder;
an axial through hole in said cylinder;
a slot in a circumferential side wall of said cylinder, said slot truncating less than about 180° of said cylinder;
a radial through hole in said slot forming an opening communicating between said slot and said axial through hole;
a notch in said side wall of said cylinder;
a mount adapted to maintain a drive pawl in operative position relative to said radial through hole;
a boss, said boss being on one side of said cylinder; and said boss being integrally formed with said cylinder;
wherein said boss is cut away flush with said axial through-hole.

5. The ejector drive hub of claim 1 wherein said boss has tapered walls.

6. The ejector drive hub of claim 5 wherein said tapered walls are tapered at about four degrees.

7. The ejector drive hub of claim 1 wherein said boss has a widening taper at its base.

8. The ejector drive hub of claim 4 wherein said cylinder and boss are 4130 steel.

9. The ejector drive hub of claim 4 wherein said boss is chamfered at its top.

10. The ejector drive hub of claim 4 wherein said boss has tapered walls.

11. The ejector drive hub of claim 10 wherein said tapered walls are tapered at about four degrees.

12. The ejector drive hub of claim 4 wherein said boss has a widening taper at its base.

13. An ejector drive hub comprising:
a cylinder;
an axial through hole in said cylinder;
a slot in a circumferential side wall of said cylinder, said slot truncating less than about 180° of said cylinder;
a radial through hole in said slot forming an opening communicating between said slot and said axial through hole;
a notch in said side wall of said cylinder;
a mount adapted to maintain a drive pawl in operative position relative to said radial through hole; and
a boss, said boss being on one side of said cylinder;
wherein said boss is cut away flush with said axial throughhole.

14. The ejector hub of claim 13 wherein said boss is integrally formed with said cylinder.

15. The ejector drive hub of claim 14 wherein said boss has tapered walls.

16. The ejector drive hub of claim 15 wherein said tapered walls are tapered at about four degrees.

17. The ejector drive hub of claim 15 wherein said boss is chamfered at its top.

18. The ejector drive hub of claim 17 wherein said boss has a widening taper at its base.

19. The ejector drive hub of claim 18 wherein said cylinder and boss are 4130 steel.

* * * * *